May 21, 1968

T. H. LEGGETT, JR 3,383,912

FORCE MEASURING APPARATUS

Filed Sept. 10, 1965

INVENTOR
THOMAS H. LEGGETT, JR.
BY Norman N. Popper
ATTORNEY

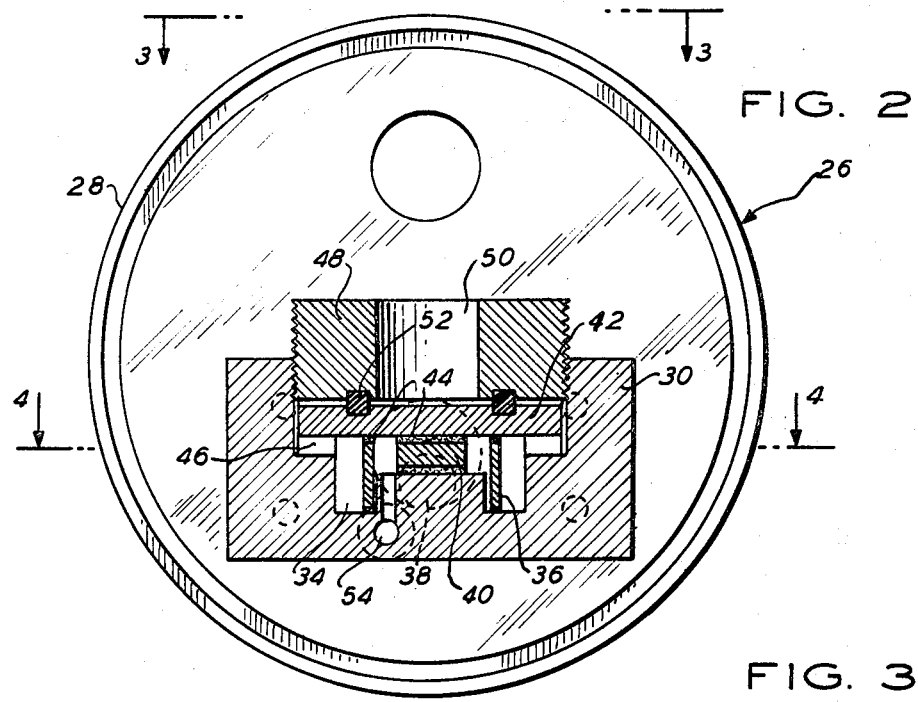
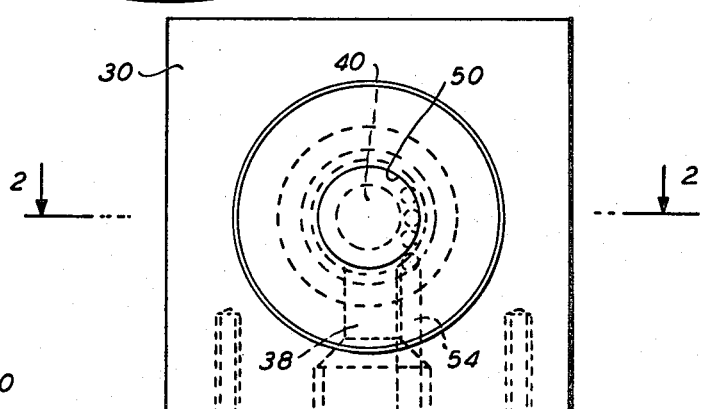
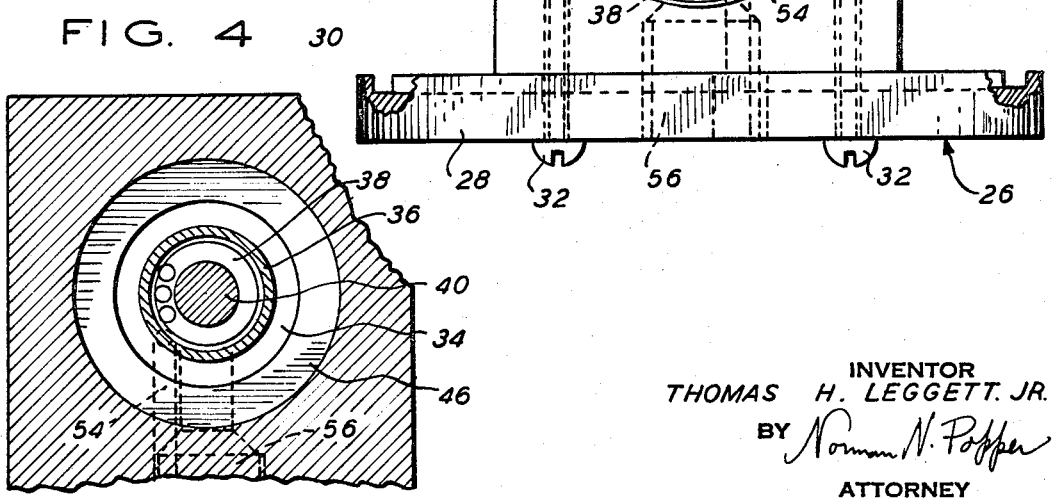

United States Patent Office 3,383,912
Patented May 21, 1968

3,383,912
FORCE MEASURING APPARATUS
Thomas H. Leggett, Jr., 223 Prospect St.,
East Orange, N.J. 07017
Filed Sept. 10, 1965, Ser. No. 486,359
11 Claims. (Cl. 73—141)

ABSTRACT OF THE DISCLOSURE

A force measuring apparatus having a first sensor responsive to variations in charge across a first crystal, and supplying its output signal to a second crystal to produce a force therein opposed to an applied force on the first sensor; a second sensor responsive to the charge applied to the second crystal.

---

In general, this invention relates to a new and improved force measuring apparatus for measuring static or dynamic forces applied in a given direction to a crystal transducer.

In the past, the measurement of forces applied in a given direction has in great measure been dependent for its accuracy upon the components of the particular instrument used. Thus, there is a need for a measuring instrument capable of extreme sensitivity and accuracy, and additionally, capable of virtually instantaneous operation unlimited by any measurable inertia and uninhibited in this accuracy by the hysteresis of the particular transducer utilized. Further, there is a need for an instrument which is stable in operation, and independent of changes in the values of the electronic components making up the measuring instrument. The present invention utilizes crystal transducers as the sensing elements. Since crystal transducers are not purely elastic, they do not return, exactly, to their non-deformed state after a force is removed. The measuring apparatus of the present invention is not dependent upon a totally elastic characteristic for the sensing element.

There is a need for a differential pressure sensor which is simple in operation and capable of measuring liquid level, flow rate, and other force variations with little or no delays due to system inertia. Accordingly, it is the general object of this invention to provide a new and improved force measuring system which is extremely accurate and has virtually no system inertia.

Another object of this invention is the provision of a new and better force measuring system capable of measuring forces in a given direction which is unaffected by minor variations in the values of electronic components utilized in the system.

Still another object of this invention is the provision of a new and better force measuring system capable of providing a differential force signal which is accurate, sensitive, and uninhibited by the hysteresis of the force transducer utilized nor by the inertia of the system.

A further object of this invention is the provision of a new and better force measuring system utilizing a crystal transducer which is unaffected by the non-elastic properties of the transducer.

A still further object of this invention is the provision of a new and better force measuring system which can be provided with a reference force in a simple and easy manner.

For the purpose of illustrating the invention, there are shown in the drawings forms which are presently preferred; it being understood, however, that this invention is not limited to the precise arrangements and instrumentalities shown.

FIGURE 2 is a cross-sectional view showing a force measuring apparatus of the present invention utilized to measure liquid level, such view taken along lines 2—2 of FIGURE 3.

FIGURE 3 is a top plan view of the apparatus of FIGURE 2.

FIGURE 4 is a partial cross-sectional view of the apparatus of FIGURE 2 taken along lines 4—4.

Figure 1:
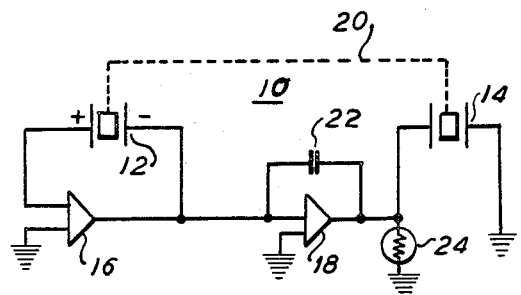
FIGURE 1 is a circuit diagram showing the circuit of the present invention.

In FIGURE 1, there is shown the force measuring and balance system of the present invention generally designated by the numeral 10. The system 10 includes a crystal transducer 12 sensitive to force variations perpendicular to the surface of a crystal; a crystal transducer 14 similar to crystal transducer 12; two standard differential input operational amplifiers 16 and 18; and a mechanical coupling element 20.

The crystal transducers 12 and 14 can be Rochelle salt, quartz, barium titanate, lead zirconate, or other equivalent material whose charge across plates on opposite sides thereof varies substantially linearly in accordance with the force applied to the individual crystal.

The operational amplifier 16 has an input impedance equal to or greater than the impedance of crystal transducer 12. The positive plate of transducer 12 is connected to the input of operational amplifier 16. Operational amplifier 16 is operative to provide an output voltage 180° out-of-phase with its input voltage. The operational amplifier 16 is adjusted so that there is zero output when there is zero charge on the transducer 12. The output of operational amplifier 16 is connected to the negative plate of crystal transducer 12 and to the input of operational amplifier 18. The input impedance of operational amplifier 18 need not be as high as that of amplifier 16.

A capacitor 22 is connected between the input and the output of amplifier 18 so that the output represents the integral of the input in a standard integrating mode. Of course, as with amplifier 16, the input to amplifier 18 is 180° out-of-phase with the output voltage thereof.

The output of amplifier 18 is connected to a high impedance voltmeter 24 and, additionally, to one plate of the crystal transducer 14. The other side of voltmeter 24 and the crystal transducer 14 are grounded.

The crystal transducers 12 and 14 are mechanically coupled through the linkage 20 which will more clearly be shown with respect to the discussion of FIGURES 2–4. When a force is applied to the linkage 20, a charge is developed across both crystal transducers 12 and 14. This charge is proportional to the applied force. The charge on transducer 14 is immediately discharged through the low impedance path to ground. The charge on transducer 12 however is amplified by operational amplifier 16 and fed back to the crystal 12 so that the output voltage of amplifier 16 equals the input voltage which is also the developed voltage across the crystal transducer 12 due to the applied force.

At the same time, the output voltage of amplifier 16 is integrated by amplifier 18 and capacitor 22. The integrated output voltage of amplifier 18 thus applies a voltage across voltmeter 24 and crystal transducer 14. The direction of voltage across transducer 14 is such as to apply a force on mechanical linkage 20 in opposition to the applied force to be measured. These opposing forces reduce the total force on transducer 12 thus lowering the voltage across transducer 12 as well as the output of amplifier 16 and the input to integrator operational amplifier 18. Since the output of integrator operational amplifier 18 is the integral of the input voltage thereto, the voltage across transducer 14 will become stable when the force on crystal transducer 12 is balanced to zero, thus reducing the charge on transducer 12 and consequently the input signal to operational amplifier 18 will be zero.

If the voltage across transducer 14 produces a balancing force against the mechanical linkage 20 greater than the applied force to be measured, then mechanically, transducer 12 will be deformed in the opposite direction to its original deformation, thus changing the sign of the charged distribution with a subsequent change of voltages throughout the circuit which in turn will lower the voltage across transducer 14 until the forces are in balance. As a result, the voltage indicated by voltmeter 24 is directly proportional to the force to be measured and applied to the linkage 20. Drift in the system due to component value changes or noise will be compensated for by the force balancing mechanism, thus maintaining a constant voltage output from integrator operational amplifier 18 for any given applied force.

In FIGURES 2–4 there is shown apparatus 26 which places transducers 12 and 14 and mechanical linkage 20 in a physical environment for the measurement of hydraulic forces. That is, the apparatus 26 can be utilized for the measurement of liquid pressure. This would be useful for depth measurement where the apparatus 26 was placed at the bottom of a vessel and the depth of the liquid in the vessel was to be measured. For this purpose, the apparatus 26 includes a mounting cap 28 for sealably mounting the apparatus 26 in position on the vessel. Secured to the inner surface of the mounting cap 28 is a block 30 fixedly secured to the mounting block 28 by bolts 32 fitting into suitable recesses on the side wall of the block 30. The block 30 has a centrally located annular recess 34 within which is positioned a first crystal transducer 36 corresponding to the crystal transducer 12 in FIGURE 1. The annular recess 34 is defined by the block 30 and a central cylindrical pedestal 38 on which rests a cylindrical transducer 40 corresponding to the crystal transducer 14 of FIGURE 1. The top surfaces of annular transducer 36 and cylindrical transducer 40 are on the same horizontal level and are adhesively secured to a common circular pressure plate 42 by way of a coating of a thixotropic epoxy cement 44. The bottom surfaces of annular transducer 36 and cylindrical transducer 40 are also bonded to the block 30 by a coating of thixotropic epoxy cement. The thixotropic epoxy cement coatings are operative to maintain the pressure plate 42 level with respect to the upper surfaces of transducers 36 and 40 and to bond the transducers between the pressure plate and the block.

The block 30 has a cylindrical recess 46 therein whose outer diameter is slightly greater than the diameter of the pressure plate 42. Recess 46 has screw threads adjacent its open upper end so as to receive a tubular member 48, screw threaded on its outer surface, in sealing engagement with the walls of the recess 46. The member 48 has a cylindrical recess 50 at the center thereof. About the cylindrical recess 50 on the bottom surface of the member 48 there is provided a groove for receiving an O-ring sealing member 52 which fits within a mating groove on the upper surface of pressure plate 42.

Thus, the pressure plate 42 is exposed to liquids within the vessel over an area defined by the O-ring seal 52. Fluids within the vessel can exert pressure on the pressure plate 42 by entering the cylindrical recess 50. This pressure is exerted on the area defined by the O-ring seal 52. The remaining portions of the block 30 are sealed from liquids within the vessel.

The wiring for the transducers 36 and 40 is connected to the outside of the vessel through conduits 54 which extend through the block 30 and integral pedestal 38. This wiring is connected to conductive plates (not shown) on top and bottom surfaces of the transducers.

The annular recesses 34 and 46 are filled with a nonelectrically conducting fluid, such as the atmosphere, through a suitable conduit 56 which extends through cover plate 28 and block 30 to annular recess 34. Thus, an initial pressure can be placed on the underside of pressure plate 42 so that the pressure plate 42 can provide a differential pressure for measurement. For example, when the apparatus 26 is utilized to measure the depth of fluid in a vessel, the conduit 56 is connected to the atmosphere immediately above the fluid level within the vessel so that the reading given by the transducers is directly proportional to the pressure exerted by the fluid in the vessel and is independent of atmospheric pressure. It will easily be understood that other reference forces can be placed on the underside of the pressure plate 42 in accordance with the teachings of the present invention. Further, it should be noted that because the pressure plate 42 is not sealed about its outer surface to the walls of the annular recess 46, fluid within the annular recess 46 will be transmitted to the upper surface of the pressure plate 42 about the ring seal 52. Accordingly, the overall pressure on the plate 42 will be measured by the force applied over an area on the bottom surface exactly comparable to the space within O-ring seal 52.

It will be understood that in the interest of ease and design, it is especially desirable to have the area of the top surface of annular transducer 36 equal to the area of the top surface of cylindrical transducer 40. Thus, a force applied to the top surface of pressure plate 42 will be equally distributed over the top surfaces of transducers 36 and 40. However, if the top surfaces of transducers 36 and 40 are unequal, the voltmeter 24 can be compensated in its readings for the unequal amount of force on transducer 14 necessary to return the output of transducer 12 to zero.

Further, it should be noted that because of the thixotropic bonding agent utilized to secure transducers 36 and 40 between pressure plate 42 and block 30 the transducers can be forced into tension and, accordingly, the fact that a particular transducer is not totally resilient and would not normally return to its initial nonelastic state when a compressive force is removed, will not affect the accuracy of the instrument as the pressure plate 42 can be forced in a manner to provide tension stresses on the transducer. The thixotropic bonding agent insures that the forces applied by pressure plate 42 will be uniformly applied across the surfaces of the transducers.

Figure 5:
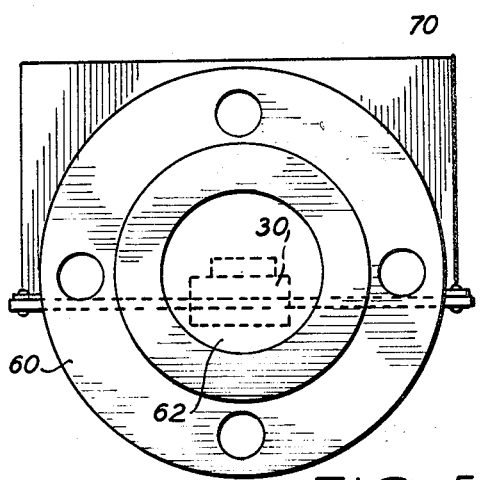
FIGURE 5 is a front view showing another form of the invention.
Figure 6:
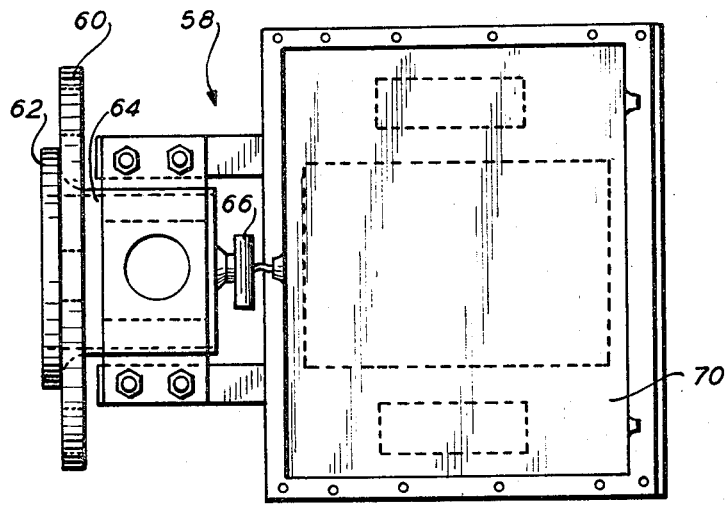
FIGURE 6 is a top view of the form of the invention shown in FIGURE 5.
Figure 7:
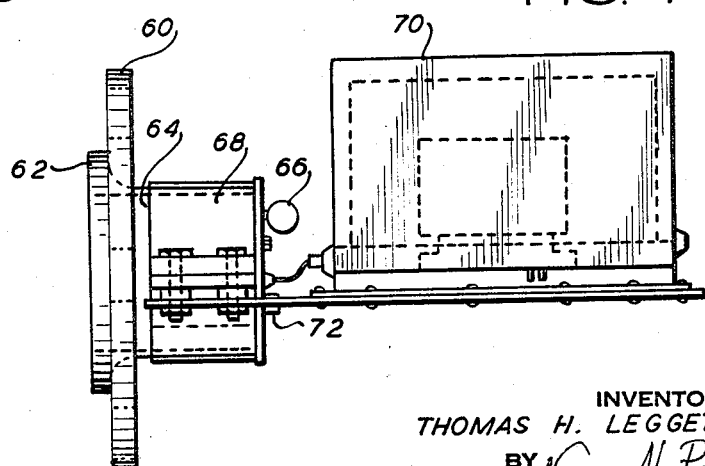
FIGURE 7 is a side view of the form of the invention shown in FIGURE 5.

In FIGURES 5, 6, and 7 there is shown still another form of the present invention in which apparatus 58 is shown, which apparatus is utilized for measing forces such as the forces within a fluid conduit. The apparatus 58 includes a pipe cap 60 which is intended to be connected to a valve or nipple. The pipe cap 60 has an opening in the center thereof covered by a force responsive diaphragm 62. The force responsive diaphragm 62 covers the open end of a cup-shaped housing 64 within which is positioned the block 30 shown in FIGURES 2–4. The cup-shaped housing 64 has a spirit level 66 on the outer surface thereof to provide a true indication of the location of the force plane. The cup-shaped housing 64 is filled with a noncompressible fluid. Thus, forces in a fluid conduit, on which the apparatus 58 is mounted, will be exerted against diaphragm 62. Diaphragm 62 will transmit these forces, through the medium of the noncompressed fluids in housing 64, to the pressure plate 42 to thus give a direct reading of the forces in the conduit.

A suitable clamp 68 is utilized to mount a housing 70 in which is placed the electrical apparatus associated with the block 30. The housing 70 contains the operational amplifiers 16 and 18 and voltmeter 24. The cup-shaped housing 64 has a suitable conduit 72 therein connected to the conduit 56 in the block 30 through which a fluid can be supplied to the annular recesses 34 and 46 to provide a reference force on the pressure plate 42. It will further be understood that an initial reading of the force placed on the pressure plate 42 as a result of the fluid in the housing 64 can be measured on the voltmeter 24. If it is desired to relieve this pressure, it is only necessary to vary the reference force supplied to the annular recesses 34 and 46.

The present invention may be embodied in other specific forms without departing from the spirit or essential attributes thereof and, accordingly, reference should be made to the appended claims rather than to the foregoing specification as indicating the scope of the invention.

I claim in my invention:

1. Force measuring apparatus comprising first and second force sensitive crystal transducers, said first and second force sensitive crystal transducers being operative to vary the electric charge on opposed surfaces thereof in accordance with the magnitude of forces applied to said crystal transducers, a mechanical force linkage system directly linking one crystal transducer to another to equalize forces on said crystal transducers, a first charge sensing means for continuously sensing the variation in charge across said first crystal transducer, said first charge sensing means being operative to supply an output signal in accordance with the force applied to said first force sensitive crystal transducer, said first charge sensing means being connected to supply its output signal to said second force sensitive crystal to produce a force therein opposed to the applied force on said mechanical linkage, and second charge sensing means for sensing the charge applied to said second force sensitive crystal, an integrator, said integrator being connected between the output of said first charge sensing means and one surface of said second crystal transducer, the other surface of said second crystal transducer being grounded.

2. The apparatus of claim 1 wherein said first charge sensing means includes an amplifier, said amplifier having the output signal thereof 180° out of-phase with respect to the input signal thereof, said first force sensitive crystal being connected between the input and output of said amplifier, the output of said amplifier being connected to said integrator.

3. Force measuring apparatus comprising first and second force sensitive crystal transducers, said first and second force sensitive crystal transducers being operative to vary the electric charge on opposed surfaces thereof in accordance with the magnitude of forces applied to said crystal transducers, a mechanical force linkage system directly linking one crystal transducer to another to equalize forces on said crystal transducers, a first charge sensing means for continuously sensing the variation in charge across said first crystal transducer, said first charge sensing means being operative to supply an output signal in accordance with the force applied to said first force sensitive crystal transducer, said first charge sensing means being connected to supply its output signal to said second force sensitive crystal to produce a force therein opposed to the applied force on said mechanical linkage, and second charge sensing means for sensing the charge applied to said second force sensitive crystal, supporting means for supporting said first and second crystal transducers for application of a force thereto, force applying means, said force applying means being operative with said supporting means for applying a predetermined force to said mechanical linkage whereby said apparatus can provide a force difference signal with respect to the predetermined force, said mechanical linkage system includes a pressure plate fixedly secured to one surface of said first and second crystal transducers, the opposite surfaces of said crystal transducers being fixedly secured to said supporting means whereby forces can be applied to said crystal transducers through said pressure plate in both tension and compression.

4. The apparatus of claim 3 wherein said pressure plate and said supporting means are bonded to said crystal transducers by a thixotropic bonding agent.

5. The apparatus of claim 3 wherein said one surface of said first crystal transducer is equal in area to said one surface of said second crystal transducer.

6. The apparatus of claim 5 wherein said first and second crystal transducers are coaxially positioned on said supporting means, one of said crystals being annular in crosssection and the other crystal being positioned within said annular crystal.

7. Force measuring apparatus comprising first and second force sensitive crystal transducers, spaced electrically conductive plates on opposite side surfaces of each of said crystal transducers, said crystal transducers being operative to vary the electric charge between said plates in accordance with a force applied to said crystal transducers, crystal supporting means for supporting said crystal transducers for application of a force thereto, mechanical linkage fixedly secured to a common surface of each of said crystal transducers, the other surface of each of said crystal transducers being secured to said crystal supporting means, an integrator, being operative to integrate the charge on one of said transducers resulting from a force being applied to said mechanical linkage system, said integrator having its output signal applied to one of the conductive plates of said second crystal transducer with the other conductive plate of said second crystal transducer being grounded, said integrator output signal being applied to said second crystal transducer in a manner to cause said second crystal transducer to exert a force opposite to that being applied to said mechanical linkage, and voltage sensing means for sensing the output voltage of said integrator.

8. The force measuring apparatus of claim 7 wherein said mechanical linkage is a pressure plate fixedly secured to said common surface of said first and second crystal transducers, said crystal supporting means including sealing means for sealing a predetermined portion of the surface of said pressure plate to said crystal supporting means to allow a fluid within said crystal supporting means to apply a reference force to said pressure plate to establish a predetermined charge between plates of said crystal transducers.

9. The force measuring apparatus of claim 8 wherein said pressure plate and said crystal supporting means are fixedly secured to said crystal transducers by a thixotropic bonding agent.

10. The force measuring apparatus of claim 8 wherein said crystal supporting means is mounted within a housing filled with a noncompressible fluid, said noncompressible fluid being in fluid communication with at least one exposed surface of said pressure plate, and means for applying a force to said noncompressible fluid through a wall of said housing to be transmitted to said exposed surface of said pressure plate.

11. The apparatus of claim 8 including fluid inlet means for supplying fluid to said crystal supporting means to vary the force exerted by said fluid on the pressure plate.

References Cited

UNITED STATES PATENTS

| 2,068,744 | 1/1937 | Gutzke | 73—35 XR |
| 3,082,334 | 3/1963 | Riesen | 73—398 XR |
| 3,258,959 | 7/1966 | Deegan | 73—141 XR |
| 3,286,523 | 11/1966 | Barrows et al. | 73—301 |

RICHARD C. QUEISSER, *Primary Examiner.*

C. D. RUEHL, *Assistant Examiner.*